Dec. 8, 1970        F. C. FRIEND        3,545,305
TWO-SPEED CLUTCH TRANSMISSION
Filed Oct. 4, 1968        2 Sheets-Sheet 1
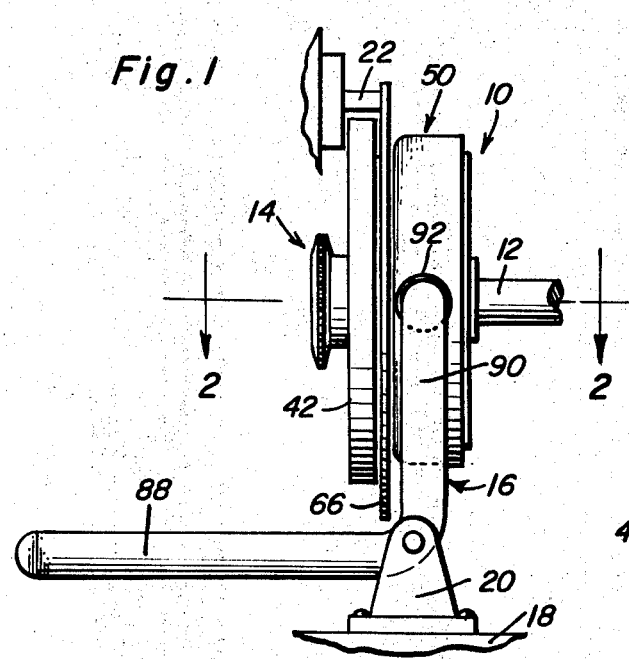
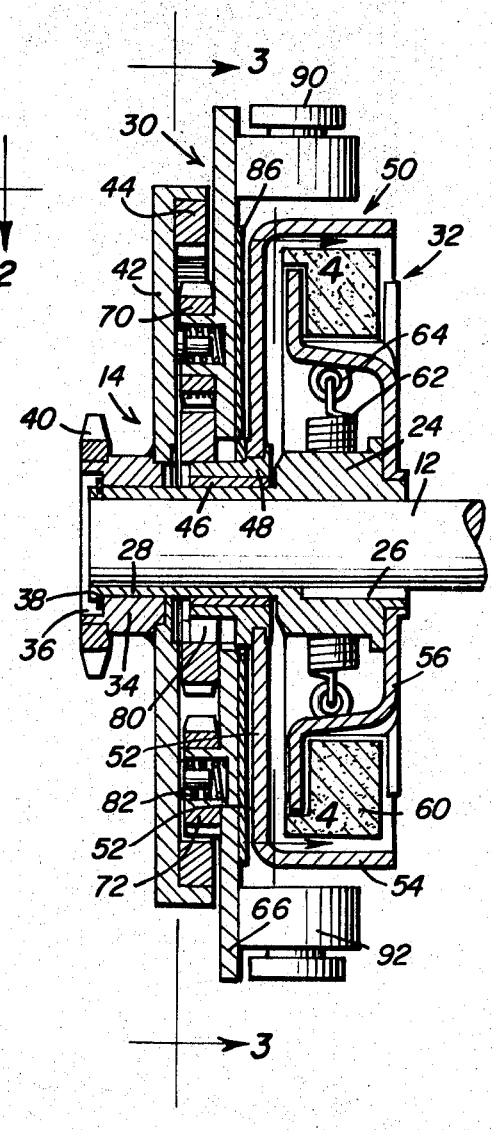
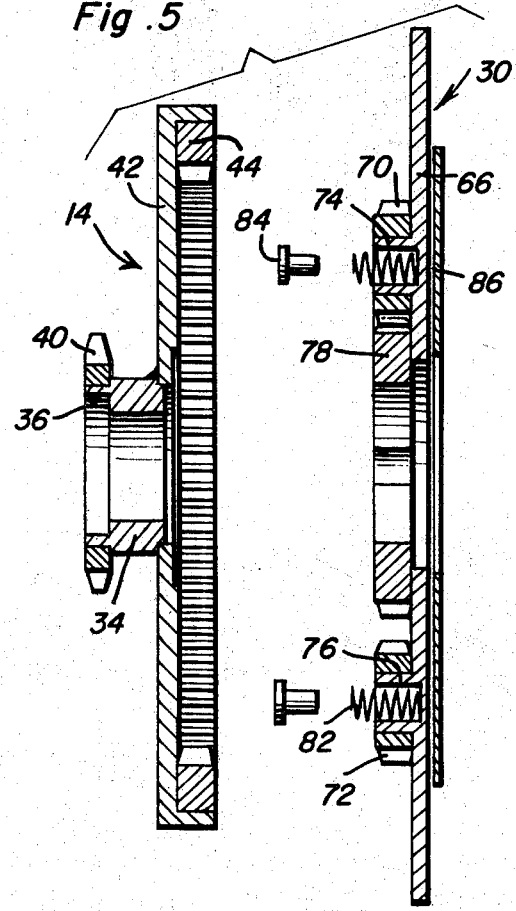
Frederick C. Friend
INVENTOR.

Dec. 8, 1970     F. C. FRIEND     3,545,305
TWO-SPEED CLUTCH TRANSMISSION
Filed Oct. 4, 1968     2 Sheets-Sheet 2

Frederick C. Friend
INVENTOR.

United States Patent Office 3,545,305
Patented Dec. 8, 1970

3,545,305
TWO-SPEED CLUTCH TRANSMISSION
Frederick C. Friend, 769 Forest Drive,
Mansfield, Ohio 44905
Filed Oct. 4, 1968, Ser. No. 765,175
Int. Cl. F16h 57/10; F16d 43/24
U.S. Cl. 74—789                                     8 Claims

ABSTRACT OF THE DISCLOSURE

An input shaft coupled to a drive member by a centrifugal clutch above a minimum speed, transmits torque to an output member at a reduction drive ratio through intermeshed idler gears rotatably mounted on a carrier plate held stationary by a brake element from which the carrier plate may be disengaged for direct drive. An actuator axially displaces the carrier plate from brake engagement to a direct drive position against a spring bias, to couple the carrier plate to the drive member through a clutch disk.

---

This invention relates to a clutch and brake controlled transmission adapted to transmit power under high strating torque conditions.

The present invention provides a relatively economical transmission adapted to accommodate starting load conditions. An input shaft rotatably mounts a drive member to which it is coupled above a predetermined minimum speed by means of a centrifugal clutch. The drive member is in operative engagement with a gear assembly consisting of a carrier plate rotatably mounting intermeshed idler gears in constant mesh with an external drive gear splined to the drive member and an internal gear fixed to the output member of the transmission. The carrier plate is axially displaceable by a limited amount between the output member and the drive member so as to either engage a brake element holding the carrier plate stationary in order to establish a reduction drive ratio between the input shaft and the output member or to a direct drive position wherein a clutch disk on the carrier plate engages the drive member for lock-up drive. A plurality of springs bias the carrier plate to its direct drive position disengaged from the brake element while a lever type actuator in engagement with the carrier plate may displace it to the reduction drive position against the bias of the springs. The springs biasing the carrier plate to the direct drive position are carried within tubular formations on which the idler gears are rotatably mounted between the carrier plate and the output member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the transmission of the present invention shown in a reduction drive condition.

FIG. 2 is an enlarged sectional view taken substantially through a plane indicated by section line 2—2 in FIG. 1.

FIG. 5 is a sectional view through disassembled portions of the transmission.

Figure 3:
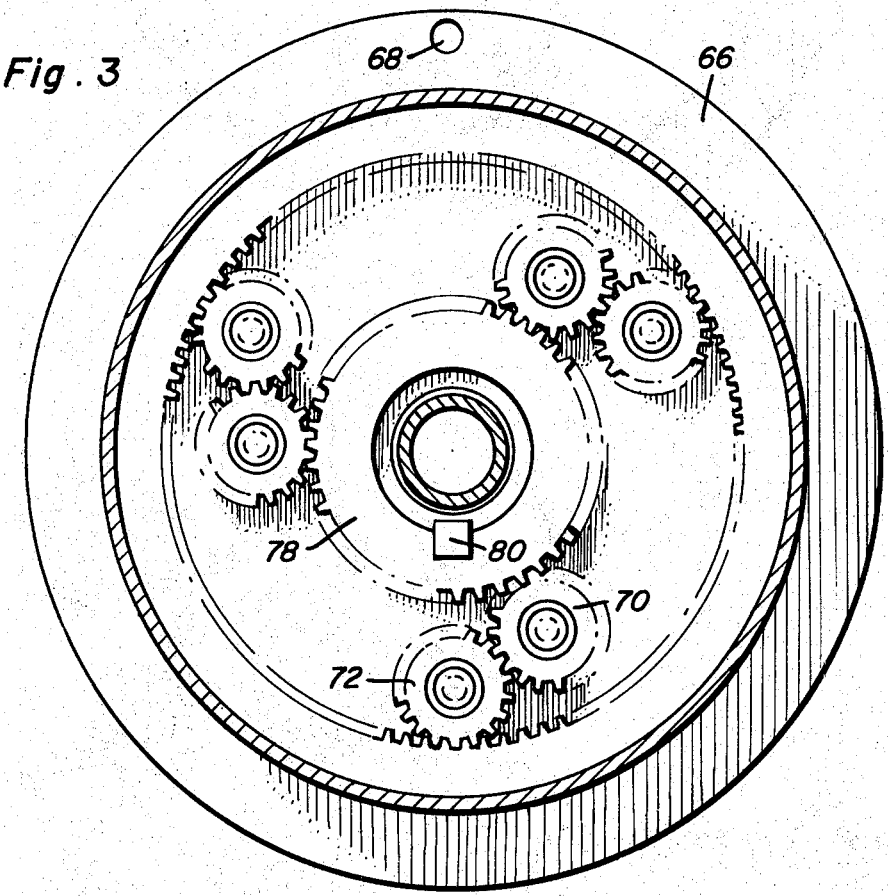
FIG. 3 is a transverse sectional view taken substantially through a plane indicated by section line 3—3 in FIG. 2.

Referring now to the drawings in detail, FIG. 1 illustrates the transmission in its entirety generally denoted by reference numeral 10. An input shaft 12 is associated with the transmission through which torque is transmitted to an output member generally referred to by reference numeral 14 axially aligned with the input member for rotation about a common axis. The input member is therefore adapted to be journaled by means (not shown) about a rotational axis which is fixed relative to a frame.

The transmission is adapted to transmit torque at two different drive ratios, as will be explained hereafter, under control of a control mechanism generally referred to by reference numeral 16 which is pivotally mounted on the frame 18 by means of a pivot bracket 20 in the illustrated embodiment. Also mounted by the frame and forming part of the control mechanism for the transmission, is a brake element in the form of a fixed pin 22 extending in parallel spaced relation to the rotational axis of the input shaft 12.

Referring now to FIG. 2 in particular, it will be observed that a hub 24 is mounted on the input shaft and is rotationally fixed thereto by means of a spline 26. A tubular sleeve 28 integral with hub extends axially therefrom to rotatably support the output member 14 and a gear assembly generally referred to by reference numeral 30. A centrifugal clutch mechanism generally referred to by reference numeral 32 is also supported by the hub 24 in axially spaced relation to the output member and the gear assembly.

The output member 14 includes a hub portion 34 having an annular recess 36 at one axial end to form an internal shoulder abutted by the axial thrust washer 38 seated in an annular groove formed adjacent the axial end of the tubular sleeve 28. The output member is thereby held axially assembled on the input shaft for rotation relative thereto. An output sprocket gear 40 may be fixed to the end of the hub portion 34 of the output member for transmitting torque to any desired location through sprocket gearing. Fixed as by welding to the axial end of the hub portion 34 opposite the sprocket gear 40, is a driven plate member 42 to which an internal gear 44 is fixed. The internal gear 44 is in constant mesh with the gear assembly 30 as will be hereafter further explained.

Rotatably mounted on the tubular sleeve 28 by means of a sleeve bearing 46, is a tubular drive shaft 48. Fixed to one axial end of the drive shaft 48 is a clutch drum 50 having an end wall 52 and an axially extending flange portion 54 enclosing the centrifugal clutch mechanism 32. The drive shaft 48 is adapted to be directly coupled to the input shaft 12 through the drum 50 and the centrifugal clutch mechanism whenever the speed of the input shaft 12 exceeds a minimum value. By limited axial displacement of the gear assembly 30 between the output member 14 and the clutch drum 50, a reduction drive ratio or a direct drive is established between the drive shaft 48 and the output member.

Figure 4:
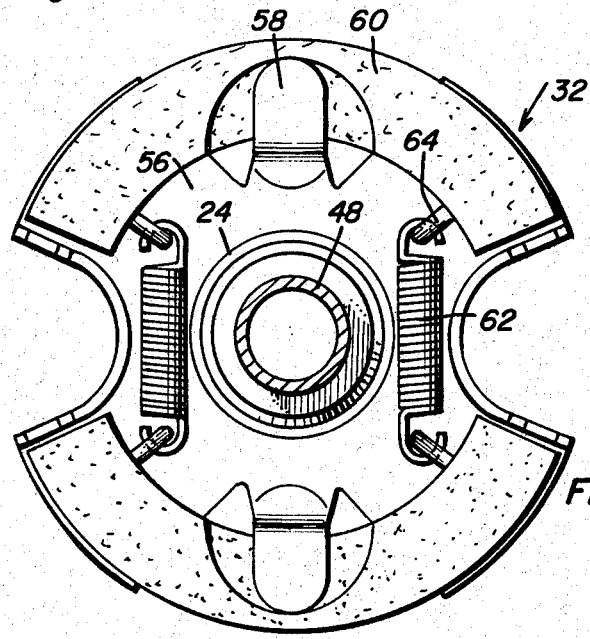
FIG. 4 is a sectional view taken substantially through a plane indicated by section line 4—4 in FIG. 2 showing the centrifugal clutch mechanism.

Referring now to FIGS. 2 and 4, it will be observed that the centrifugal clutch mechanism 32 includes a mounting plate member 56 from which a pair of guide tongues 58 extend for guiding radial movement of a pair of arcuate friction faced clutch elements 60 adapted to move radially outwardly under the influence of centrifugal force to engage the internal surface of the flange portion 54 in order to couple the input shaft to the drive shaft member 48. The clutch elements 60 are biased to their radially retracted positions by means of a pair of springs 62, the opposite ends of which are secured to the arcuate clutch elements 60 by means of anchors 64.

Referring now to FIGS. 2, 3 and 5, it will be noted that the gear assembly 30 includes a carrier plate member 66 which extends radially beyond the output member and is provided with an aperture 68 as shown in FIG. 3 for purposes to be hereafter explained. The carrier plate member rotatably mounts three pairs of intermeshed idler gears 70 and 72 equally spaced from each other. Accordingly, the carrier plate member is provided with three radially inner tubular formations 74 and three radially outer tubular formations 76 on which the intermeshed idler gears are rotatably supported for rotation about axes movable with the carrier plate member 66 about the rotational axis of the input shaft 12. The carrier plate member is supported in coaxial relation to the input shaft 12 by virtue of the constant mesh relationship between the idler gears 70 and an external drive gear 78 coaxially supported on and rotationally fixed to the drive shaft 48 by means of the spline 80. The other idler gears 72, are in constant mesh with the internal gear 44 associated with the output member 14.

Each of the tubular formations 74 and 76 on which the idler gears are rotatably supported, receives a compression coil spring member 82 the opposite ends of which react between the carrier plate member 66 and a friction pad 84 biased into engagement with the driven plate 42 of the output member 14. Accordingly, the springs 82 axially bias the gear assembly toward the clutch drum 50. An annular clutch disk 86 fixed to the side of the carrier plate member opposite the idler gears is thereby engaged with the end wall 52 of the clutch drum in order to establish a lock-up direct drive relationship between the drive shaft 48 and the output member 14.

The aperture 68 formed in the radially outer portion of the carrier plate member 66 is radially positioned for receiving the stationary brake pin element 22 so that when the gear assembly 30 is displaced to the position illustrated in FIGS. 1 and 2, the brake pin element holds the carrier plate member stationary thereby establishing a reduction drive ratio between the drive shaft member 48 and the output member 14 because of the meshing relationship of the idler gears to both the drive gear 78 splined to the drive shaft member and the internal driven gear 44 fixed to the output plate portion 42. The gear assembly is displaced to the position illustrated in FIGS. 1 and 2 against the bias of the springs 82 by means of the control mechanism 16 holding the clutch disks 86 out of engagement with the clutch drum 50. The control mechanism includes an actuator lever 88 having a pair of yoke arms 90 rotatably mounting rollers 92 about axes parallel to the carrier plate member 66 in angularly spaced relation to the brake pin 22. The actuator lever 88 must therefore be angularly displaced in a counterclockwise direction as viewed in FIG. 1 in order to hold the carrier plate member engaged with the stationary brake pin 22 for establishing the reduction drive ratio aforementioned. Upon release of the actuator lever, the springs 82 displace the gear assembly to the direct drive position wherein the clutch disk 86 engages the clutch drum 50 and the carrier plate member is disengaged from the brake pin 22 so that it is free to rotate. The gear assembly will then be in a locked up condition with the drive shaft member 48 so as to transmit torque at a direct drive to the output member.

It will be apparent from the foregoing description, that the transmission 10 will be inoperative to transmit torque to the output member 14 until a predetermined minimum speed is attained at which point the arcuate clutch elements 60 associated with the centrifugal clutch mechanism 32 move radially outwardly into engagement with the clutch drum 50 thereby coupling the input shaft 12 to the drive shaft member 48. Also, under starting conditions it will be desirable to hold the gear assembly 30 in its reduction drive position by means of the control mechanism 16 since in the reduction drive ratio, a relatively high torque is transmitted.

When the starting load is reduced, the control mechanism is released so that the springs 82 displace the gear assembly to the direct drive position. Engagment of the carrier plate member 66 by the rollers 92 of the control mechanism avoid imposition of any retarding torque on the gear assembly in the direct drive position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A transmission, comprising an output member, a drive member mounted for rotation relative to the output member, gear means drivingly connecting the drive member to the output member for rotation thereof at a reduction drive ratio, and control means engageable with the gear means for axial displacement thereof, said gear means including a carrier member, idler gears rotatably mounted by the carrier member in constant mesh with the drive and the output members, a clutch element mounted by the carrier member, and spring means mounted by the carrier member in abutment with the output member for biasing the clutch element into engagement with the drive member.

2. The combination of claim 1 wherein said control means includes positive brake means engageable with the carrier member of the gear means in one angular position thereof and actuator means engageable with the carrier member for axial displacement of the clutch element out of engagement with the drive member against the bias of said spring means.

3. The combination of claim 1 wherein said spring means comprises tubular formations on the carrier member rotatably mounting the idler gears, compression springs housed within the tubular formations, and abutment pads biased by the springs into engagement with the output member.

4. The combination of claim 3 including centrifugal clutch means engageable with the drive member for limiting transmission of torque from the drive member to the output member to speeds of the drive member above a predetermined minimum.

5. The combination of claim 4 wherein said control means includes positive brake means engageable with the carrier member of the gear means in one angular position thereof and actuator means engageable with the carrier member for axial displacement of the clutch element out of engagement with the drive member against the bias of said spring means.

6. The combination of claim 5 wherein said drive member comprises a torque transmitting sleeve rotatably mounted on the input member, and a drum fixed to the sleeve in axialy spaced relation to the gear means, said drum having an end wall axially engageable by the clutch element and an internal flange surface engageable by the speed responsive clutch means, said gear means further including a drive gear splined to the sleeve and in constant mesh with the idler gears for axial displacement with the carrier member relative to the sleeve and the drum.

7. In a transmission having an output member, a drive member, gear means drivingly connecting the drive member to the output member, and control means engageable with the gear means for axial displacement thereof, said gear means including a carrier member having tubular formations and idler gears rotatably mounted on said tubular formations, and spring means urging the carrier member in one axial direction including compression springs housed within the tubular formations, and abutment pads biased by the springs into engagement with the output member.

8. The combination of claim 7 wherein said drive member comprises a torque transmitting sleeve rotatably mounted on the input member, and a drum fixed to the sleeve in axially spaced relation to the gear means, said drum having an end wall axially engageable by the clutch element and an internal flange surface engageable by the speed responsive clutch means, said gear means further including a drive gear splined to the sleeve and in constant mesh with the idler gears for axial displacement with the carrier member relative to the sleeve and the drum.

References Cited

UNITED STATES PATENTS

| | | | |
|---|---|---|---|
| 971,756 | 10/1910 | Jones | 74—789 |
| 980,948 | 1/1911 | Hering | 74—789 |
| 1,083,863 | 1/1914 | Schortman | 74—789 |
| 1,099,464 | 6/1914 | Olson | 74—789 |
| 2,087,261 | 7/1937 | Miller | 74—789 |
| 3,350,955 | 11/1967 | Von Ruden | 192—105X |

A. T. McKEON, Primary Examiner

U.S. Cl. X.R.

192—105